US011778072B2

(12) United States Patent
Engel et al.

(10) Patent No.: US 11,778,072 B2
(45) Date of Patent: Oct. 3, 2023

(54) CONTROL AND DATA TRANSFER SYSTEM FOR SUPPORTING DIFFERENT COMMUNICATION PROTOCOLS AND AN ADAPTER MODULE

(71) Applicant: Phoenix Contact GmbH & Co. KG, Blomberg (DE)

(72) Inventors: Andreas Engel, Schieder-Schwalenberg (DE); Martin Marschner, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 17/271,559

(22) PCT Filed: Aug. 21, 2019

(86) PCT No.: PCT/EP2019/072393
§ 371 (c)(1),
(2) Date: Feb. 25, 2021

(87) PCT Pub. No.: WO2020/043572
PCT Pub. Date: Mar. 5, 2020

(65) Prior Publication Data
US 2022/0124178 A1 Apr. 21, 2022

(30) Foreign Application Priority Data
Aug. 27, 2018 (BE) .................................. 2018/5589

(51) Int. Cl.
*H04L 69/08* (2022.01)
*H04L 69/00* (2022.01)
(52) U.S. Cl.
CPC .............. *H04L 69/08* (2013.01); *H04L 69/02* (2013.01)

(58) Field of Classification Search
None
See application file for complete search history.

(56) References Cited

U.S. PATENT DOCUMENTS

| 7,865,629 B1 | 1/2011 | Tantos et al. |
| 2005/0208967 A1* | 9/2005 | Buniatyan ......... H04M 1/72409 |
| | | 714/E11.12 |

(Continued)

FOREIGN PATENT DOCUMENTS

| CN | 103840990 A | 6/2014 |
| CN | 104698962 A | 6/2015 |

(Continued)

OTHER PUBLICATIONS

Authorized Officer: Nora Lindner, English translation of the International Preliminary Report on Patentability issued in counterpart PCT application No. PCT/EP2019/072393, dated Mar. 11, 2021, 8 pp.

(Continued)

*Primary Examiner* — Younes Naji
(74) *Attorney, Agent, or Firm* — KAPLAN BREYER SCHWARZ, LLP

(57) ABSTRACT

A control and data transfer system for supporting different communication protocols, in which the system includes a control device that can store a plurality of different communication protocols. The control device is adapted for loading and executing at least one of the stored communication protocols. Further, a first adapter module is connectable to the control device. The first adapter module includes an identification device which enables the control device to identify the first communication protocol, and a communications interface for connecting, to the first adapter module, at least one first device that is configured for communication according to one of the stored communication protocols. The control and evaluation device is configured to use the (Continued)

identification device for identifying the first communication protocol when the first adapter module is connected to the control device, and to load and execute the identified first communication protocol from the storage device.

17 Claims, 5 Drawing Sheets

(56) References Cited

U.S. PATENT DOCUMENTS

| | | | |
|---|---|---|---|
| 2008/0013569 A1 | 1/2008 | Boren | |
| 2009/0006709 A1* | 1/2009 | Zhao | G06F 13/409 |
| | | | 710/315 |
| 2010/0262744 A1 | 10/2010 | Deva et al. | |
| 2011/0072185 A1 | 3/2011 | Pinto et al. | |
| 2012/0188731 A1 | 7/2012 | Alley et al. | |
| 2013/0173719 A1 | 7/2013 | Ahmed et al. | |
| 2014/0280791 A1 | 9/2014 | Decusatis et al. | |
| 2015/0120062 A1 | 4/2015 | Mckinzie et al. | |
| 2015/0370751 A1* | 12/2015 | Perrine | G06F 13/4252 |
| | | | 710/106 |
| 2016/0078260 A1 | 3/2016 | Scholz et al. | |
| 2016/0188525 A1 | 6/2016 | Graffy et al. | |
| 2016/0328347 A1* | 11/2016 | Worley | G06F 13/4282 |
| 2017/0317915 A1 | 11/2017 | Ritmanich | |
| 2019/0260212 A1* | 8/2019 | Li | H02J 7/00047 |
| 2020/0327081 A1 | 10/2020 | Friesen et al. | |

FOREIGN PATENT DOCUMENTS

| | | | | |
|---|---|---|---|---|
| CN | 107124337 A | 9/2017 | | |
| DE | 19714868 C2 | 9/2001 | | |
| DE | 10036686 A1 | 2/2002 | | |
| DE | 102004031138 A1 | 4/2005 | | |
| DE | 20023622 U1 | 7/2005 | | |
| DE | 102009045055 A1 | 3/2011 | | |
| DE | 102014118389 A1 | 6/2016 | | |
| DE | 10223724 B4 | 6/2017 | | |
| DE | 102015122066 A1 | 6/2017 | | |
| DE | 102018120823 B3 | 12/2019 | | |
| EP | 0391157 A2 | 10/1990 | | |
| EP | 0871130 B1 | 9/2003 | | |
| EP | 1936457 B1 | 4/2009 | | |
| EP | 1958169 B1 | 11/2015 | | |
| EP | 2958028 A1 | 12/2015 | | |
| EP | 2992392 B1 | 7/2018 | | |
| EP | 3476083 B1 | 2/2020 | | |
| EP | 2958028 B1 * | 5/2020 | | G06F 13/385 |
| GB | 2444451 A | 6/2008 | | |
| JP | 62-266947 A | 11/1987 | | |
| JP | 2011-008497 A | 1/2011 | | |
| WO | 2007/030544 A2 | 3/2007 | | |
| WO | 2009/118018 A1 | 10/2009 | | |
| WO | 2009/131985 A2 | 10/2009 | | |
| WO | 2013/033889 A1 | 3/2013 | | |
| WO | 2014/177485 A1 | 11/2014 | | |
| WO | 2016/201353 A1 | 12/2016 | | |
| WO | WO-2018018607 A1 * | 2/2018 | | H04L 29/06 |

OTHER PUBLICATIONS

Authorized Officer: Rudolph, Stefan, International Search Report issued in counterpart PCT application No. PCT/EP2019/072393, dated Nov. 13, 2019, 13 pp.

Representative Examiner: Rudolph, Stefan, Office Action issued in European patent application No. 19755397.7-1244, dated Mar. 14, 2023, 13 pp. w/ translation.

* cited by examiner

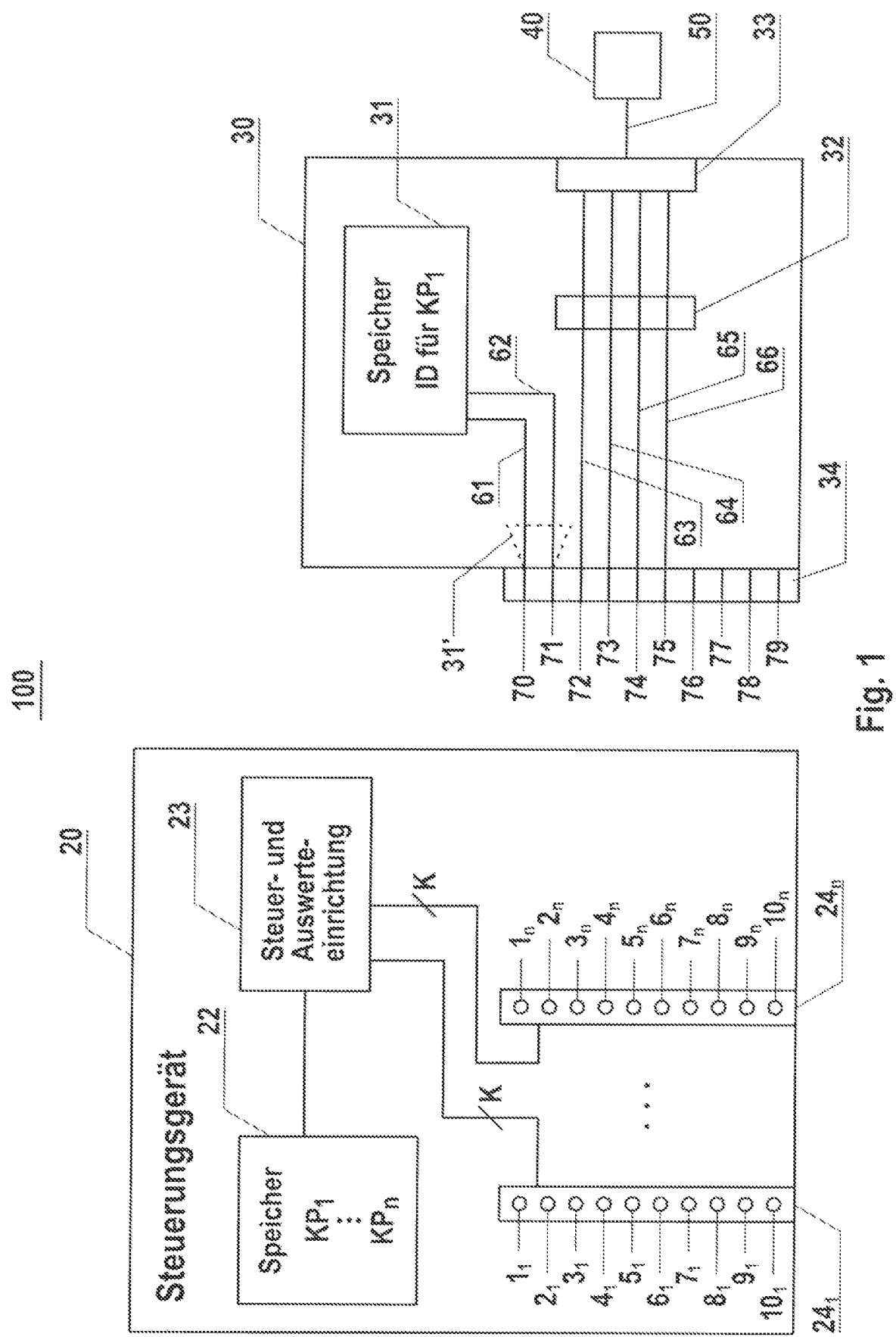

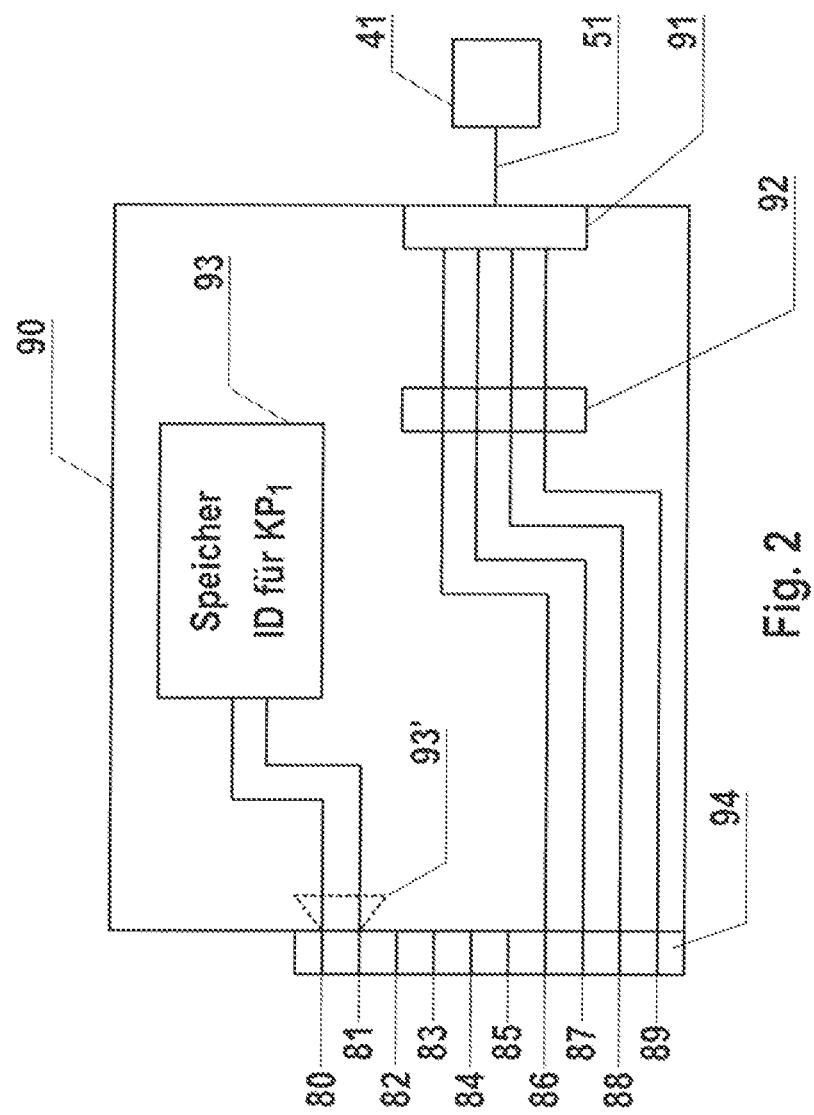

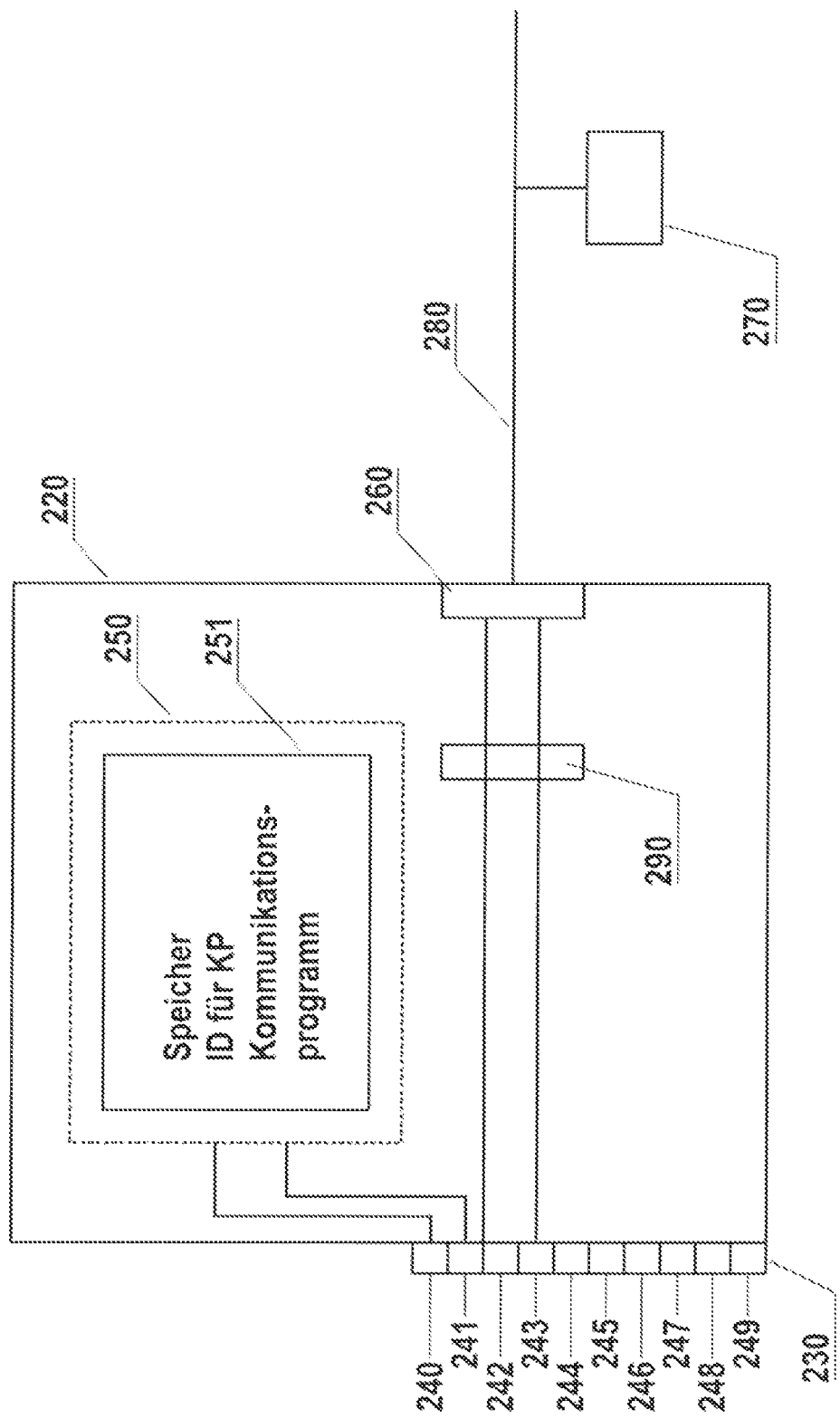

CONTROL AND DATA TRANSFER SYSTEM FOR SUPPORTING DIFFERENT COMMUNICATION PROTOCOLS AND AN ADAPTER MODULE

FIELD

The invention relates to a control and data transfer system for supporting different communication protocols and to an adapter module for use in such a control and data transfer system.

BACKGROUND

In particular in the field of automation technology it may happen again and again that different bus systems each requiring different communication protocols or bus protocols have to be connected to control units. A well-known solution approach for this is to develop a special control unit for each bus system, which, however, can only communicate with the special bus system.

From EP 0 391 157 A2, an arrangement is known for connecting a processing unit to a bus via an adaptable interface module. The interface module has a microprocessor, a bus interface for connection to a bus, and a HOST interface for connection to a processing unit. A program is provided for operating the microprocessor, which enables data exchange between the bus and the interface module as well as the processing unit. The interface module can be configured as a plug-in unit.

From US 2008/0013569 A1, a universal controller is known which enables data communication between external electronic devices using a communication protocol that is selected from among multiple communication protocols. The universal controller includes a bus translator module which can exchange data with a first connectable device. Furthermore, a field interface is provided, which can have multiple input/output ports to which at least one second external device can be connected. Coupled to the field interface is a protocol firmware module which has a plurality of protocol drivers each corresponding to a different communication protocol. In response to data received from the first device, the bus translator device specifies a desired one of the multiple communication protocols to enable the protocol firmware module to establish data communication between the first and second external devices using the protocol driver that corresponds to the desired communication protocol.

SUMMARY

The invention is based on the object to provide a control and data transfer system and an adapter module for use in such a control and data transfer system, which enable a control device to communicate with different bus systems in a flexible, simple, and cost-effective manner.

The technical problem stated above is solved, on the one hand, by the features of claim 1.

Accordingly, a control and data transfer system is provided for supporting different communication protocols. The control and data transfer system comprises a control device including the following features:
a storage device which is able to store at least a first and a second communication protocol, the first and second communication protocols being different,
a control and evaluation device configured for executing the communication protocols stored in the storage device, and at least one first connector having a plurality of selectable electrical terminals or contacts.

It should be noted, here, that the control and evaluation unit may, for example, be a Field Programmable Gate Array (FPGA), and/or a CPU, and/or a microcontroller, and/or an application-specific integrated circuit (ASIC). The storage device may, for example, be a non-volatile memory. The control and data transfer system preferably includes only a single control device.

It should also be noted that the selectable electrical terminals of the at least one first connector can preferably be selected or enabled on the basis of the communication protocol executed by the control device.

Furthermore, the control and data transfer system comprises a first adapter module that can be connected to the control device and that includes the following features:
a second connector having a plurality of electrical terminals or contacts, wherein the second connector is configured for being electrically and mechanically mated with the at least one first connector;
an identification device enabling identification of the first communication protocol, in particular for the control device;
a communication interface for connecting at least one first device that is configured for communication according to the first communication protocol to the first adapter module via a first bus system which uses the first communication protocol.

Preferably, the first adapter module may furthermore include a device for signal level conversion in accordance with the first communication protocol.

It should be noted that the communication interface may comprise a plug-in connector to which the first bus system and thus the first device are connectable. The first device is preferably an electronic device, in particular a field bus device. Such a field bus device may, for example, be any of a sensor, actuator, bus coupler, or bus gateway.

The control and evaluation unit of the control device is configured to use the identification device for identifying the first communication protocol to be used when the first adapter module is connected to the control device, and to load and execute the identified first communication protocol from the storage device, so that communication is enabled according to the first communication protocol between the at least one first device connected to the first adapter module and the control device It should be noted that more than the two communication protocols can be stored in the storage device, and that all of the stored communication protocols are different.

The communication protocols preferably each correspond to a respective control program which can be stored in the storage device. The first communication protocol may be the Interbus communication protocol, for example, while the second communication protocol may be the MIO bus protocol, for example.

Furthermore, it should be noted that the at least one first connector may be a predetermined, for example a standardized electrical connector such as the AXIO connector. If a plurality of first connectors are implemented in the control device, these will preferably always be the same predetermined electrical connectors.

According to an advantageous embodiment, a third communication protocol may be stored in the storage device of the control device, which differs from the first and second communication protocols. The third communication protocol may be the CAN bus protocol, for example. Furthermore, a second adapter module may be provided, which is connectable to the control device and includes the following features:

a third connector having a plurality of electrical terminals, which is configured for being electrically and mechanically mated with a further first connector of the control device;

an identification device enabling identification of the third communication protocol, in particular for the control device;

a communication interface for connecting at least one second device to the second adapter module via a second bus system, which second device is configured for communication according to the third communication protocol;

and optionally a device for signal conversion according to the third communication protocol.

The control and evaluation unit of the control device is furthermore configured to use the identification device of the second adapter module for identifying the third communication protocol to be used when the second adapter module is connected to the control device, and to load and execute the identified third communication protocol from the storage device, so that communication is enabled according to the third communication protocol between the at least one second device connected to the second adapter module and the control device.

It should be noted at this point that the adapter modules and the control device are implemented as separate components.

According to an advantageous embodiment, the control and evaluation unit of the control device is configured to be responsive to the identified first communication protocol by choosing the corresponding electrical terminals of the first connector and/or to be responsive to the identified third communication protocol by choosing the corresponding electrical terminals of the further first connector, i.e. to make them available for data communication.

According to an advantageous embodiment, the identification device of the first adapter module comprises a storage device which stores an identifier of the first communication protocol. In this case, the control and evaluation device is configured to read out the storage device of the identification device when the first adapter module is connected to the control device. Additionally or alternatively, the identification device of the second adapter module may comprise a storage device which stores an identifier of the third communication protocol. In this case, the control and evaluation device is configured to read out the storage device of the identification device of the second adapter module when the second adapter module is connected to the control device.

The identifier of the first communication protocol and the identifier of the third communication protocol may, for example, each be represented by the type plate of the device that is connectable to the respective adapter module.

Alternatively or additionally, according to an advantageous embodiment, the identification device of the first adapter module may comprise an electronic circuit, in particular a microcontroller, FPGA or ASIC module, which stores an identifier of the first communication protocol. In this case, the control and evaluation device is configured to prompt the electronic circuit of the first adapter module to transmit the identifier of the first communication protocol to the control device when the first adapter module is connected to the control device, or the microcontroller of the first adapter module is configured to initiate transmission of the identifier of the first communication protocol to the control device when the first adapter module is connected to the control device.

Alternatively or additionally, the identification device of the second adapter module may comprise an electronic circuit as well, in particular a microcontroller, FPGAS or ASIC module, which stores an identifier of the third communication protocol. In this case, the control and evaluation device is furthermore configured to prompt the electronic circuit of the second adapter module to transmit the identifier of the third communication protocol to the control device when the second adapter module is connected to the control device, or the electronic circuit of the second adapter module is configured to initiate transmission of the identifier of the third communication protocol to the control device when the second adapter module is connected to the control device.

Preferably, the storage devices mentioned above form part of the respective electronic circuit.

Alternatively, the identification device of the first adapter module and/or the identification device of the second adapter module may be implemented as a passive means which can be used, for example, to bridge or short-circuit particular electrical terminals of the second connector and/or particular electrical terminals of the third connector.

It will be appreciated that the control device can have exactly one first connector or even more than two first connectors, so that, if desired, more than two adapter modules each supporting a different communication protocol can be connected to the control device at the same time.

In order to be able to execute a plurality of different communication protocols or to be able to connect a plurality of different bus systems to the control device, preferably simultaneously, the first adapter module may furthermore comprise a further communication interface for connecting, to the first adapter module via a third bus system, at least one third device that is configured for communication according to a fourth communication protocol, and may optionally include a further device for signal level conversion according to the fourth communication protocol. In this case, the identification device of the first adapter module additionally enables identification of the fourth communication protocol, in particular for the control device.

In this case, the control and evaluation device is configured to use the identification device to also identify the fourth communication protocol to be used when the first adapter module is connected to the control device, and to load from the storage device and execute the identified fourth communication protocol, so that communication is also enabled according to the fourth communication protocol between the at least one third device connected to the first adapter module and the control device.

This exemplary embodiment is in particular useful when the control device only has a single first connector.

It should be noted that the control device is advantageously configured such that communication according to the first communication protocol and communication according to the fourth communication protocol can be performed simultaneously.

According to an advantageous embodiment, the control and evaluation device is configured to be responsive to the identified first communication protocol by choosing a first set of electrical terminals from among the electrical terminals of the first connector, and to be responsive to the identified fourth communication protocol by choosing a second set of electrical terminals from among the electrical terminals of the first connector, with the first and second sets each containing respective different terminals.

According to a further advantageous embodiment, the identification device of the first adapter module may comprise a storage device which stores an identifier of the first communication protocol and an identifier of the fourth communication protocol. In this case, the control and evaluation device of the control device is configured to read out the storage device when the first adapter module is connected to the control device.

According to a further advantageous embodiment, the identification device of the first adapter module may comprise an electronic circuit, in particular a microcontroller, FPGA or ASIC, which stores an identifier of the first communication protocol and an identifier of the fourth communication protocol. In this case, the control and evaluation device may be configured to prompt the electronic circuit to transmit the identifier of the first communication protocol and the identifier of the fourth communication protocol to the control device when the first adapter module is connected to the control device. Alternatively or additionally, the electronic circuit may be configured to itself initiate transmission of the identifier of the first communication protocol and the identifier of the fourth communication protocol to the control device when the first adapter module is connected to the control device.

According to an advantageous embodiment, the control and evaluation device may be configured to identify whether a bus system using the second communication protocol is directly connected to the at least one first connector, and once it has been detected that the bus system which uses the second communication protocol is connected to the at least one first connector, the control and evaluation device will execute the second communication protocol.

According to an advantageous embodiment, the control and data transfer system may comprise a third adapter module that is connectable to the control device, comprising a connector having a plurality of electrical terminals and configured for being electrically and mechanically mated with the at least one first connector;
an identification device enabling identification of a fifth communication protocol which can be stored in the third adapter module; and
a communication interface for connecting at least one device that is configured for communication according to the fifth communication protocol to the third adapter module via a fifth bus system; wherein the control and evaluation device is configured to use the identification device for identifying the fifth communication protocol when the third adapter module is connected to the control device, and
to execute the identified fifth communication protocol stored in the adapter module, so that communication is enabled according to the fifth communication protocol between the at least one device connected to the third adapter module and the control device.

The third adapter module may, for example, include a device for signal level conversion in accordance with the fifth communication protocol.

According to a simple and cost-effective approach it is contemplated that the identification device, preferably of the first adapter module, includes at least one electrical wire which short-circuits at least two predetermined electrical terminals, and/or that the identification device of the second adapter module preferably includes at least one electrical wire which short-circuits at least two predetermined electrical terminals. The control and evaluation device may expediently be configured to detect the short-circuited electrical terminals and, based thereon, to identify the communication protocol to be used. In other words: the control and evaluation device is adapted to identify that at least one bus system or a further device is connected via the respective adapter module, which bus system or further device uses a predetermined communication protocol for data communication, for example the first or third communication protocol.

The technical problem stated above is also solved by the features of claim 15.

As claimed therein, an adapter module is provided for use in a control and data transfer system. The adapter module comprises a connector that has a plurality of electrical terminals and is configured for being electrically and mechanically mated with a complementary connector of a control device. Furthermore, the adapter module comprises an identification device which enables a connectable control device to identify a first communication protocol. The adapter module furthermore comprises a communication interface for communication with at least one device that is connectable to the adapter module and is configured for communication according to the first communication protocol, and optionally comprises a device for signal level conversion according to the first communication protocol.

According to an advantageous embodiment, the identification device comprises a storage device which stores an identifier of the first communication protocol.

As an alternative or in addition thereto, the identification device includes an electronic circuit, in particular a microcontroller, FPGA or ASIC, which stores an identifier of a first communication protocol, and the electronic circuit is configured to transmit the identifier to a control device when the adapter module is connected to the control device.

According to an advantageous embodiment, the identification device is configured to enable in particular an external control device to identify a second communication protocol. Furthermore, the adapter module has a further communication interface for communication with at least one device that is connectable to the first adapter module and is configured for communication according to the second communication protocol, and optionally includes a further device for signal level conversion according to the second communication protocol.

Furthermore, the storage device of the identification device may store an identifier of the second communication protocol.

As an alternative or in addition thereto, the electronic circuit may store an identifier of the first communication protocol and an identifier of the second communication protocol. The electronic circuit is configured to transmit the identifiers to a control device when the adapter module is connected to the control device.

The technical problem stated above is also solved by the features of claim 23. Accordingly, the adapter module is provided for use in a control and data transfer system according to any one of claims 1 to 14. The adapter has the following features:
a connector having a plurality of electrical terminals and configured for being electrically and mechanically mated with a connector of a control device;
an identification device which enables a connectable control device to identify a communication protocol that is stored in the adapter module; and
a communication interface for connecting, to the adapter module via a bus system, at least one device that is configured for communication in accordance with the communication protocol stored in the adapter module.

Optionally, this adapter module may include a device for signal level conversion in accordance with the stored communication protocol.

According to a simple and cost-effective approach it is contemplated that the identification device of the adapter module comprises at least one electrical wire which short-circuits at least two predetermined electrical terminals.

BRIEF DESCRIPTION OF THE DRAWINGS

The invention will now be explained in more detail by way of several exemplary embodiments in conjunction with the accompanying drawings, wherein:

FIG. 2 shows a further adapter module that is connectable to the control device shown in FIG. 1 or FIG. 3;

DETAILED DESCRIPTION

Figure 1:
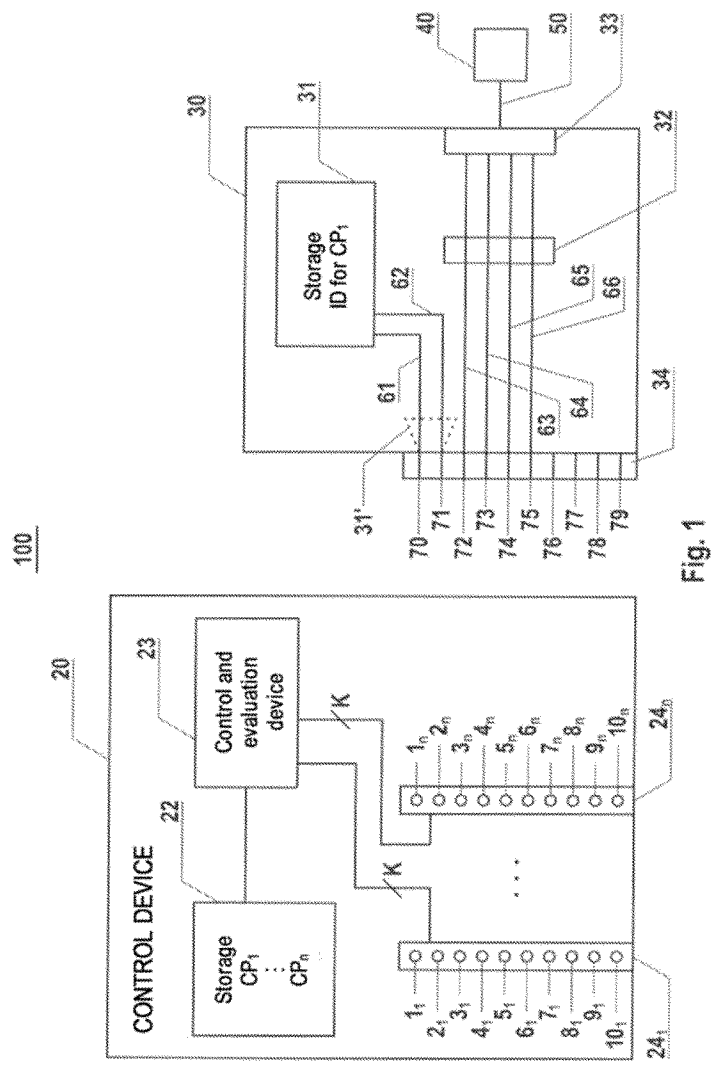
FIG. 1 shows an exemplary control and data transfer system according to the invention, which comprises a single control device and a connectable adapter module.

FIG. 1 shows an exemplary control and data transfer system 100 which, for example, can be installed in an automation environment, in particular in an industrial automation installation.

Figure 3:
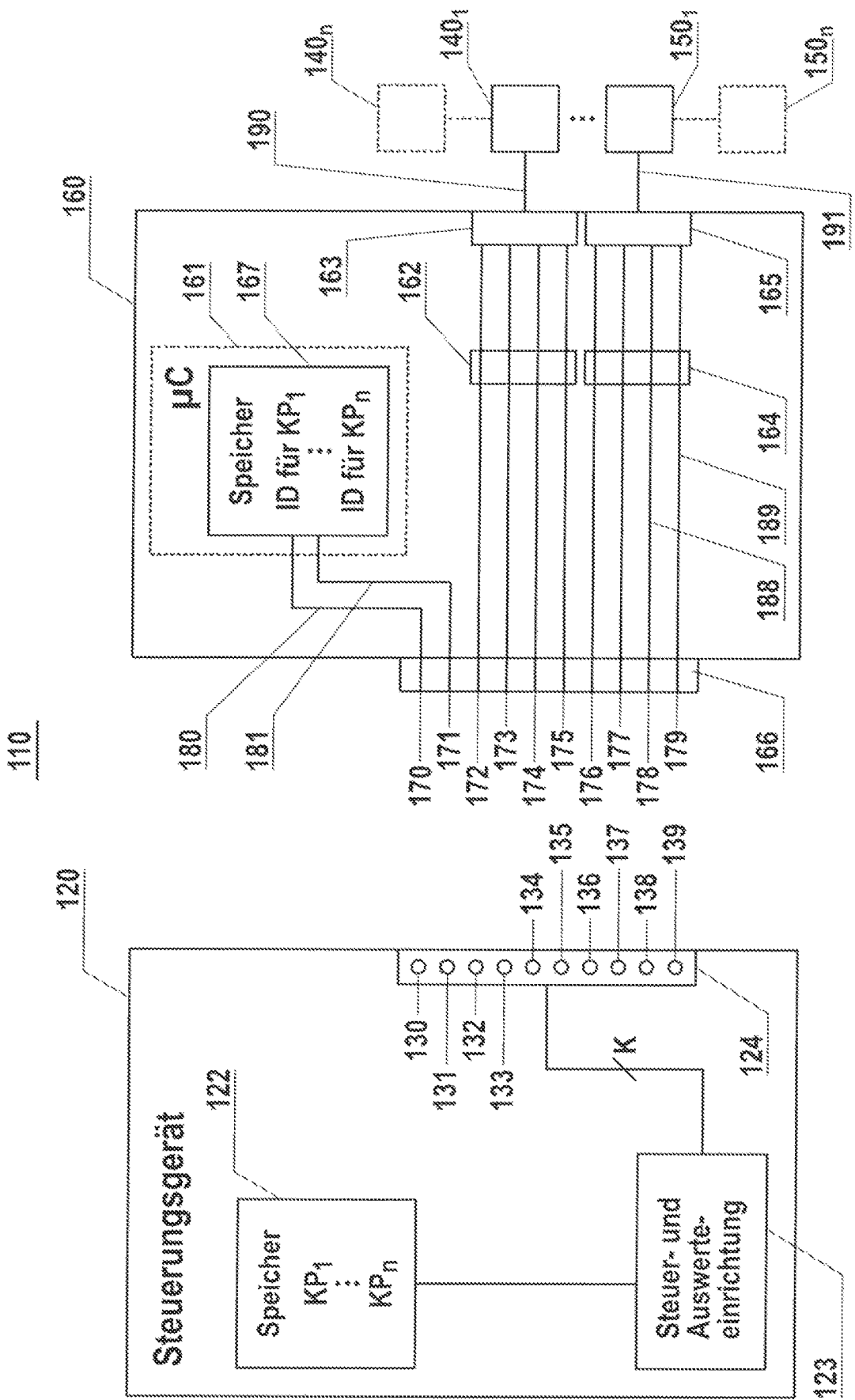
FIG. 3 shows a further exemplary control and data transfer system according to the invention, which comprises a control device and an adapter module connectable thereto.
Figure 4:
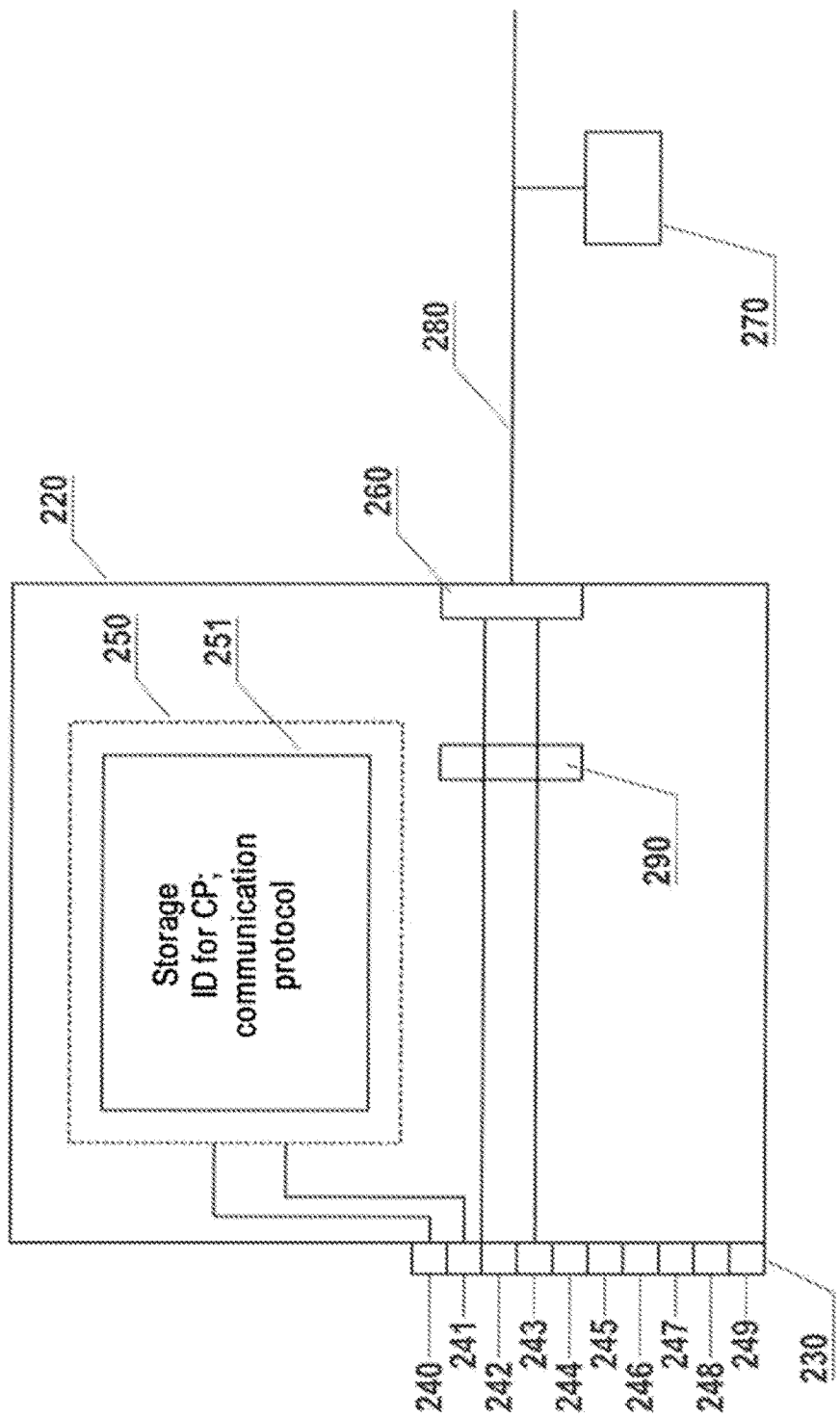
FIG. 4 shows another exemplary adapter module according to the invention, which is connectable to the control device shown in FIG. 1 or FIG. 3.
Figure 5:
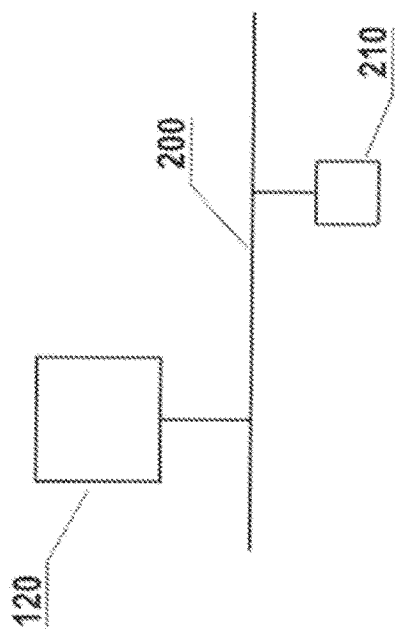

The control and data transfer system 100 preferably includes a single control device 20 to which an adapter module or a plurality of adapter modules can be connected, preferably detachably, for example the adapter module 30, and/or the adapter module 90 shown in FIG. 2, and/or the adapter module 160 shown in FIG. 3, and/or or the adapter module 220 shown in FIG. 4. Furthermore, it is also possible to directly, i.e. without an adapter module, connect a bus system 200 and a field bus subscriber 210 to the control device 20.

The adapter module 30 is operable to enable data communication between the control device 20 and at least one device 40 via a first bus system 50 which uses a first communication protocol $CP_1$. The device 40 preferably is an electronic field bus device such as a sensor, an actuator, a bus coupler, or bus gateway, which use the first communication protocol $CP_1$ for communication.

It should already be noted, here, that further first devices can be connected to the adapter module 30 and thus to the control device 20 via bus 50. The device 40 and any further devices have in common that they employ the first communication protocol $CP_1$ for communication with the control device 20.

Figure 5:
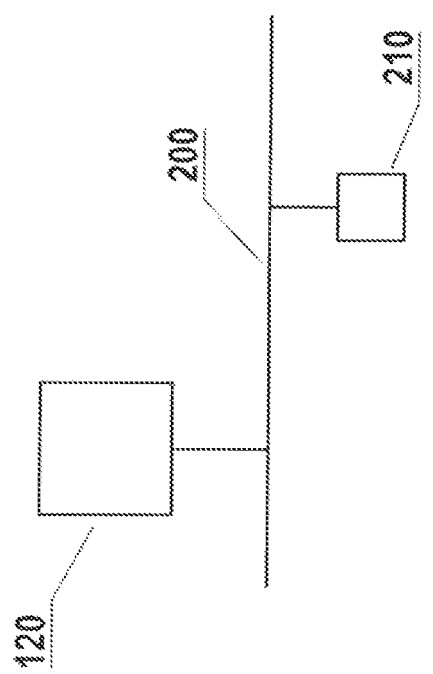
FIG. 5 shows an exemplary bus system that can be directly connected to the control device shown in FIG. 1 or FIG. 3.

Control device 20 comprises a storage device 22 which stores at least two different communication protocols $CP_1$ through $CP_n$, i.e. at least a first and a second communication protocol, which are different. Furthermore, the control device 20 comprises a control and evaluation device 23 which may be in the form of an FPGA and/or a CPU and/or an ASIC and/or a microcontroller, for example. Control and evaluation device 23 is configured to execute the communication protocols $CP_1$ to $CP_n$ as stored in storage device 22. The communication protocols are preferably stored in the storage device 22 in the form of a respective digital control program and are executed, for example, by appropriate protocol drivers that may be implemented in the control and evaluation device 23. It should already be mentioned, here, that the control device 20 executes the second communication protocol only if a bus system 200 as shown in FIG. 5, by way of example, is directly connected to the control device 20, i.e. without using an adapter module. Although only one device 210 is connected to the bus system 200, it will be appreciated that it is also possible to connect a plurality of devices to the bus system 200, in particular fieldbus subscribers, all of which use the second communication protocol for communication.

Control device 20 furthermore comprises at least one first connector having a plurality of selectable electrical terminals. In the present example, a plurality of first connectors may be implemented, although, for convenience, FIG. 1 only shows two first connectors $24_1$ and $24_n$. It should be noted at this point that the first connectors $24_1$ through $24_n$ may preferably be connectors of identical design and functionality, for example in the form of AXIO plug-in connectors.

In the example shown, the two first connectors $24_1$ and $24_n$ are in the form of female connectors each having k electrical terminals $1_1$ to $10_1$ and $1_n$ to $10_n$, respectively, where k is 10, for example. Of course, the connectors may also be in the form of male/connectors. FIG. 1 schematically illustrates that all electrical terminals of first connector $24_1$ and of first connector $24_n$ are connected to the control and evaluation device 23. Also, storage 22 and the control and evaluation device 23 are electrically interconnected.

The first adapter module 30 that is connectable to control device 20 comprises a second connector 34 having a plurality of electrical terminals 70 to 79, and the second connector 34 is configured for being electrically and mechanically mated with first connector $24_1$ or with the other first connector $24_n$. The second connector 34 is configured complementary to the first connector and accordingly also has k terminals, i.e. ten electrical terminals 70 to 79 in the present example, which are in the form of pin, i.e. male, terminals in the present example, in order be mateable with the electrical female terminals of first connector $24_1$ or of the other first connector $24_n$.

The first adapter module 30 has implemented therein an identification device 31 which enables identification of the first communication protocol $CP_1$, in particular for the control device 20. In the present example, identification device 31 comprises a storage device which stores an identifier of the first communication protocol $CP_1$. Storage device 31 is electrically wired to the pin terminals 70 and 71 of second connector 34, for example. First adapter module 30 furthermore comprises a communication interface 33 for communication with the at least one first device 40 that is connectable to the first adapter module 30 and is configured for communication in accordance with the first communication protocol $CP_1$. Communication interface 33 comprises an electrical connector to which the device 40 can be connected via bus 50, for example. According to the first communication protocol $CP_1$, communication interface 33 has four ports, for example, which may be hard-wired to electrical pin terminals 72, 73, 74, and 75, for example, of the second connector. For this purpose, electrical wires 63, 64, 65, and 66 are used, as shown in FIG. 1 by way of example. Furthermore, depending on the implementation, the first adapter module 30 may comprise a device 32 for signal level conversion in accordance with the first communication protocol. For example, the signals arriving at communication interface 33 and having a defined voltage level are converted to a voltage level of 3.3 volts in level conversion device 32 in order to be adapted to control device 20. In the opposite direction, the signals coming from the control device are converted, by the level conversion device, to the signal level defined for communication interface 33, which is predefined by the first communication protocol.

Control and evaluation device 23 is configured to use the identification device 31 to identify the first communication protocol $CP_1$ that is to be used when the first adapter module 30 is connected to the control device 20, and to load and execute the identified first communication protocol $CP_1$ from storage device 22 so that communication in accordance with the first communication protocol is enabled between the at least one first device 40 connected to the first adapter module 30 and the control device 20.

For the sake of completeness it should be mentioned that FIG. 1 shows the control device 20 and the adapter module 30 in the separated state. For being electrically and mechanically mated, the second connector 34 of adapter module 30 is plugged into one of the two first connectors $24_1$ or $24_n$.

In order to allow for communication between control device 20 and a further bus system via a third communication protocol, adapter module 90 as shown in FIG. 2 can be used.

Similarly to the first adapter module 30, the second adapter module 90 comprises a third connector 94 including a plurality of electrical terminals 80 to 89, and the third electrical connector 94 is configured for being electrically and mechanically mated with one of the first connectors $24_1$ through $24_n$ of control device 20.

Similarly to the second connector 34 of adapter module 30, the third connector 94 of adapter module 90 may have ten pin terminals 80 to 89 which can be introduced into the corresponding female terminals of first connector $24_1$ or $24_n$. The second adapter module 90 likewise has an identification device 93 which allows to identify a third communication protocol $CP_n$, in particular for control device 20. As illustrated in FIG. 2, the identification device 93 may again comprise a storage device which is electrically connected to the two pin terminals 80 and 81 of third connector 94. The storage device of identification device 93 stores an identifier of the third communication protocol $CP_n$. Furthermore, a communication interface 91 is implemented in the second adapter module 90, which is configured for communication with at least one second device 41 that is connectable to the second adapter module 90 via a bus system 51 and is configured for communication according to the third communication protocol $CP_n$. Preferably, the device 41 is an electronic field bus device. Communication interface 91, in turn, may comprise an electrical connector to which the second device 41 is connectable via bus system 51. Bus 51 and device 41 use the third communication protocol $CP_n$. The second adapter module 90 may, but does not need to, include a device 92 for level conversion in accordance with the third communication protocol $CP_n$. For example, level conversion device 92 converts the signals arriving at communication interface 91 and having a defined voltage level to a voltage value of, e.g., 3.3 volts, to be adapted to control device 20. In the opposite direction, the signals coming from the control device are converted, by level conversion device 92, to the signal level defined for communication interface 91, which is predefined by the third communication protocol.

According to the third communication protocol, the communication interface may again have four terminals or ports which are electrically connected to the pin terminals 86, 87, 88, and 89 of the third connector 94 through connecting wires or conductor traces, in accordance with the third communication protocol.

The control and evaluation device 23 of control device 20 is configured to use the identification device 93 of the second adapter module 90 to identify the third communication protocol $CP_n$ that is to be used when the second adapter module 90 is connected to the control device 20, and to load and execute the identified third communication protocol from storage device 22, so that communication is enabled between the at least one second device 41 connected to the second adapter module 90 and the control device 20 in accordance with the third communication protocol. It should be noted that data communication between control device 20 and devices 40 and 41 can take place simultaneously.

The operating principle of the exemplary control and data transfer system 100 as shown in FIG. 1 for supporting different communication protocols will now be explained in more detail.

Assuming, that the first adapter module 30 is electrically and mechanically connected to the control device 20 via second connector 34 and first connector 24i. Control and evaluation device 23 is configured or programmed to retrieve the identifier of the first communication protocol $CP_1$ stored in the storage device of the identification device 31 of first adapter module 30, via predefined terminals, here the two female terminals $1_1$ and $2_1$ of the first connector $24_1$, and hence via pin terminals 70 and 71 of the second connector 34. In response to the retrieved identifier of the first communication protocol, the control and evaluation device 23 identifies the first communication protocol $CP_1$ and loads the first communication protocol stored in storage device 22, for execution in the control and evaluation device 23. Furthermore, the control and evaluation device 23 is configured to be responsive to the identified first communication protocol $CP_1$ by selecting the corresponding electrical terminals of the first connector 24i. In the present example, this means that the control and evaluation device 23 selects the electrical terminals $3_1$, $4_1$, $5_1$, and $6_1$ of the first connector $24_1$ for establishing and controlling communication between control device 20 and device 40 via pin terminals 72 through 75 of the second connector and via communication interface 33 of the adapter module 30 using the first communication protocol.

Assuming furthermore, that the second adapter module 90 is also electrically and mechanically connected to the control device 20, via third connector 94 and first connector $24_n$. The control and evaluation device 23 is configured or programmed to retrieve the identifier of the third communication protocol $CP_n$ stored in the storage device of the identification device 93 of second adapter module 90, via predefined terminals, here the two female terminals $1_n$ and $2_n$ of the first connector $24_n$, and hence via pin terminals 80 and 81 of the second connector 94. In response to the retrieved identifier of the third communication protocol, the control and evaluation device 23 identifies the third communication protocol $CP_n$ and loads the third communication protocol stored in storage device 22, for execution in the control and evaluation device 23. Furthermore, the control and evaluation device 23 is configured to be responsive to the identified third communication protocol $CP_n$ by selecting the corresponding electrical terminals of the first connector $24_n$. In the present example, this means that the control and evaluation device 23 selects the electrical terminals $7_n$, $8_n$, $9_n$, and $10_n$ of the first connector $24_n$ for establishing and controlling communication between control device 20 and device 41 via pin terminals 86 through 89 of the third connector 94 and via communication interface 91 of the adapter module 90 using the third communication protocol.

As already mentioned above, more than two different bus systems can be connected to the control device 20 via corresponding adapter modules. It should also be noted, here, that communication according to the first and third communication protocols between the control device 20 and the two devices 40 and 41 may be performed according to a master and slave operation, with the control device 20 being the master and the two devices 40 and 41 functioning as a slave.

Furthermore, it will be appreciated that the bus system 200 and the device 210 as illustrated in FIG. 5 can be directly connected to at least one of the first connectors $24_1$ to $24_n$, i.e. without an adapter module. Bus system 200 uses the second communication protocol. In this case, the control and evaluation device 23 of control device 20 will detect that the bus system 200 is directly connected, and then the control and evaluation device 23 will perform communication between the control device 20 and the bus system 200 via the second communication protocol associated with the bus system 200. The bus system 200 may, for example, be the AXIO bus system, in which case the associated AXIO communication protocol is employed, which is stored in control device 20 as the second communication protocol.

It's worth noting that the identification device of an adapter module, such as adapter module 30, 90, or 160, may alternatively be configured in the form of an electrical wire which can be used to short-circuit predetermined electrical terminals. This can be referred to as pin coding. This means that, instead of a storage-based solution, at least two electrical terminals such as, e.g., electrical terminals 80 and 81 in the form of pin terminals of the connector 94 of the adapter module 90 of FIG. 2 can be short-circuited by an electrical connection or wire 93', for example. The electrical wire 93' is shown as a dashed line in FIG. 2. The same alternative solution is shown in FIG. 1, in which the electrical terminals 70 and 71 in the form of pin terminals are short-circuited by an electrical wire 31'. In this case, the control and evaluation device 23 is configured to detect the short-circuited pin terminals 80 and 81, i.e. to identify the associated pin coding and, based thereon, to identify the communication protocol to be used. In other words: the control and evaluation device 23 is able to conclude, from the detected short circuit, that a bus system or the device 41 is connected via the adapter module 90, which bus system or device 41 uses a predetermined communication protocol for data communication, for example the third communication protocol $CP_n$. Similarly, the control and evaluation device 23 is configured to detect the short-circuited pin terminals 70 and 71, i.e. to identify the associated pin coding and, based thereon, to identify the communication protocol to be used. In other words: the control and evaluation device 23 is able to conclude, from the detected short circuit, that a bus system or the device 40 is connected via the adapter module 30, which bus system or device 40 uses a predetermined communication protocol, for example the first communication protocol $CP_1$ for data communication.

In the case where an adapter module such as the adapter module 30 or 90 comprises at least one further communication interface (a further communication interface is only illustrated in FIG. 3) to which a bus system or a device can be connected that uses a second communication protocol for communication, the identification device may comprise a further electrical wire (not shown). According to this solution, at least two further electrical terminals, for example the electrical terminals 83 and 84 of connector 94 of the adapter module 90 in the form of pin terminals can be short-circuited by the further electrical wire. In this case, the control and evaluation device 23 is configured to also detect the short-circuited pin terminals 83 and 84 and, based thereon, to identify the second communication protocol that is to be used. In other words: the control and evaluation device 23 is able to conclude, from the detected short circuit, that a further bus system or a further device is connected via the adapter module 90, which uses the second communication protocol $CP_2$ for data communication, for example.

The advantage of the control and data transfer system 100 shown in FIG. 1 is that the control device 20 is able to communicate easily and quickly with different bus systems, preferably even simultaneously with different bus systems through different communication protocols.

FIG. 3 shows another exemplary control and data transfer system 110 for supporting different communication protocols. This system 110 may also be installed in an automation environment.

Control and data transfer system 110 preferably comprises a single control device 120 in which only a single first connector 124 is implemented. Furthermore, a storage device 122 is implemented in control device 120, which stores a plurality of different communication protocols $CP_1$ through $CP_n$. Preferably, at least two different communication protocols are stored in storage device 122, and in the present example there are three communication protocols, namely a first, second, and a third one, the first and third communication protocols being executed when an adapter module is used, while the second communication protocol is executed when the bus system 200 shown in FIG. 5 is directly connected to the control device 120.

Furthermore, control device 120 comprises a control and evaluation device 123 which is connected to storage device 122 and to connector 124. The control and evaluation device 123 is, for example, in the form of an FPGA (Field Programmable Gate Array), and/or a CPU, and/or a microcontroller, and/or an application-specific integrated circuit (ASIC). The first connector 124 of control device 120 has, for example, ten electrical terminals 130 to 139, which may be in the form of female terminals, for example. The control and evaluation device 123 is configured to execute the communication protocols stored in storage device 122. Connectable to control device 120 are the adapter module 30, the adapter module 90, the adapter module 160 as shown in FIG. 3, or the adapter module 220 shown in FIG. 4, for example. It should be noted that the control and evaluation device 123 may be provided in the form of an FPGA and/or a CPU and/or an ASIC, for example.

Adapter module 160 comprises a connector 166 which may be configured complementary to the connector 124 of control device 120. In the illustrated exemplary embodiment, the connector 166 of adapter module 160 has ten pin terminals 170 to 179, which can be mated with the respective female terminals 130 to 139 of connector 124. Adapter module 160 furthermore has an identification device 161 which enables the control device 120 to identify at least one communication protocol. Similarly to identification devices 31 and 93 of adapter modules 30 and 90, respectively, the identification device 161 may comprise a storage device 167 or an electronic circuit in which the storage device 167 is integrated, for example. In the present example, the electronic circuit is a microcontroller. However, it could also be provided in the form of an FPGA or ASIC. Alternatively, the microcontroller could access a separate storage device. Storage device 167 can store a plurality of identifiers each one identifying a different communication protocol. The identification device 161 may be connected to two predetermined pin terminals, here pin terminals 170 and 171 of adapter module 160, via two electrical wires, for example.

In addition, the adapter module 160 has at least one communication interface 163 which is used for communication with at least one first device 1401 that is connectable to the adapter module 160 and configured for communication in accordance with a first communication protocol $CP_1$. Furthermore, preferably, at least one device 162 for level conversion according to the first communication protocol is provided, which is associated with the first communication interface 163. The first communication interface 163 comprises an electrical connector to which the device 1401 can be connected via a bus system 190. Device 1401 and bus system 190 communicate using the first communication protocol $CP_1$. The first communication interface 163 has, for example, four ports which are connected to predetermined electrical pin terminals of connector 166, in the present example to electrical pin terminals 172, 173, 174, and 175, through electrical wires or conductor traces.

In order for the control device 120 which preferably only has the single connector 124 to be able to nevertheless communicate with a plurality of different bus systems that each use a different communication protocol, for example even at the same time, the adapter module 160 may have at least one further communication interface 165 comprising an electrical connector to which a device 150₁ is connectable via a bus system 191, for example. Device 150₁ and bus system 191 communicate via a third communication protocol $CP_n$. In this case, in addition to a first identifier identifying the first communication protocol, the storage device 167 stores at least one further identifier identifying the third communication protocol. FIG. 3 schematically illustrates that in addition to the device 1401, further devices 140 can be connected to the bus system 190, all of which use the first communication protocol $CP_1$. Similarly, in addition to device 150₁, further devices 150ₙ can be connected to the further bus system 191, all of which use the third communication protocol $CP_n$. The devices 140 and 150 may again be electronic devices such as sensors, bus couplers, bus gateways, and/or actuators.

The second communication interface 165 may also have four ports which are permanently connected or hard-wired to the electrical terminal pins 176, 177, 178, and 179 of connector 166 through the illustrated electrical links. In the present case, the adapter module 160 additionally comprises a further device 164 for signal level conversion in accordance with the third communication protocol $CP_n$. Level conversion devices 162 and 164 have the same task as level converters 32 and 92. However, it should be noted that the first communication interface 163 and the second communication interface 165 may have a different number of ports.

In other words: As illustrated in FIG. 3, the ports of communication interface 163 are connected to a first set of electrical pin terminals 172-175 of connector 166, while the ports of communication interface 165 are connected to a second set of electrical pin terminals 176-179 of connector 166, and the respective sets of electrical terminals do not include any shared contact. Should the connector 166 still have free electrical terminals, it is even possible to connect more than two communication interfaces in adapter module 160 to the free electrical terminals of connector 166 in an appropriate manner, so that communication between control device 120 and more than two different bus systems is made possible.

It should furthermore be noted that the microcontroller 161 may be configured to identify whether the communication interfaces 163 and 165 have something connected thereto.

The operating principle of the control and data transfer system 110 shown in FIG. 3 will now be explained in more detail.

Assuming that the device 1401 is connected to communication interface 163 and that the device 150₁ is connected to communication interface 165 and that the adapter module 160 is electrically and mechanically mated with control device 120.

The control and evaluation device 123 is now able to detect the electrical coupling between control device 120 and adapter module 160 and is furthermore configured to identify, with the aid of identification device 161, the communication protocols that are to be used.

To this end, according to an advantageous embodiment, the control and evaluation device 123 is notified by the microcontroller-based identification device 161, via terminals 130, 131, 170, and 171, that the communication interfaces 163 and 165 are each connected to a bus system, 190 and 191, respectively. In response to this information, the control and evaluation device 123 then prompts the identification device 161 to transmit the stored identifiers of the two communication protocols $CP_1$ and $CP_n$ associated with the two communication interfaces 163 and 165. As an alternative, the identification device 161 in the form of a microcontroller may itself initiate transmission of the two identifiers of the communication protocols $CP_1$ and $CP_n$ to the control device 120.

Based on the two identifiers received, the control and evaluation device identifies the first communication protocol $CP_1$ and the third communication protocol $CP_n$. The control and evaluation device 123 is furthermore configured to be responsive to the identified first communication protocol $CP_1$ by choosing a first set of electrical terminals 132, 133, 134, and 135 of the connector 124 and to be responsive to the identified third communication protocol $CP_n$ by choosing a second set of electrical terminals 136, 137, 138, and 139 from among the electrical terminals of the connector 124, the first and second sets containing respective different electrical terminals, i.e. no shared terminal. Furthermore, the control and evaluation device 123 is configured to load and execute the identified first communication protocol $CP_1$ and the identified third communication protocol $CP_n$ from the storage device 122, so that communication is enabled between the at least one device 1401 connected to adapter module 160 according to the first communication protocol $CP_1$ and, preferably at the same time, further communication is enabled between the at least one device 150₁ connected to the adapter module 160 according to the third communication protocol $CP_1$.

As mentioned before, the control device 120 can also be connected to the device 40 via adapter module 30, or to the device 41 via adapter module 90. In this case, similarly to the procedure previously described with regard to the adapter module 160, only the one identifier stored in the identification device 31 will be transmitted to the control and evaluation device 123 when the adapter module 30 is connected to the control device 120. In response to the received identifier, only the first communication protocol $CP_1$ will be loaded into and executed by the control and evaluation device 123. Accordingly, there will only be one communication via the adapter module 30 between the control device 120 and the device 1401, in accordance with the first communication protocol $CP_1$.

If, instead of adapter module 30, the adapter module 90 is connected to the control device 120, the previously described procedure will proceed in a similar manner so that the control device 120 will then be able to communicate with the device 41 via adapter module 90 using the third communication protocol.

As with control device 20, the control device 120 also stores a second communication protocol which is loaded and executed by the control and evaluation device 123 when, for example, the bus system 200 which uses the second communication protocol is directly connected to the electrical connector 124, i.e. without connecting an adapter module therebetween.

In this case, the control device 120 will automatically perform communication with the bus system 200 and the device 210 in accordance with the predetermined communication protocol.

In other words: Both the control device 20 and the control device 120 may be able, especially upon booting of an operating system, to check whether a bus system is connected via an adapter module or whether a bus system 200 is directly connected, i.e. without an adapter module connected therebetween.

FIG. 4 shows a further exemplary adapter module 220 which differs from the adapter modules 30, 90, and 160 in particular by the fact that it stores a fourth communication protocol in the adapter module 220, which differs from the first, second, and third communication protocols, for enabling communication between a bus system 280 or a device 270 connected thereto, which use the fourth communication protocol, with the control device 20 or the control device 120. Bus system 280 may have a plurality of devices connected thereto, in particular in the form of field bus subscribers. The adapter module 220 can also be electrically and mechanically coupled to any one of the connectors $24_1$ through $24_n$ of control device 20 or to the connector 124 of control device 120.

For this purpose, the adapter module 220 comprises a connector 230 which may be configured complementary to the connector 124 of control device 120 or to the connectors $24_1$ to $24_n$ of control device 20. In the exemplary embodiment discussed, the connector 230 of adapter module 220 has ten pin terminals 240 through 249, which can be mated with the respective female terminals 130 through 139 of connector 124 or with the respective female terminals of any one of the connectors $24_1$ to $24_n$ of control device 20. The adapter module 220 furthermore comprises an identification device 250 which enables the control device 120 to identify the fourth communication protocol. Similar to the identification devices 31, 93, and 161 of adapter modules 30, 90, or 160, the identification device 250 may include a storage device 251 or an electronic circuit with the storage device 251 integrated therein, for example. The electronic circuit preferably is in the form of a microcontroller. It may also be implemented in the form of an FPGA or ASIC. Alternatively, the microcontroller could access a separate storage device. In addition to the identifier of the fourth communication protocol, storage device 251 also stores the fourth communication protocol itself. However, the fourth communication protocol is neither stored in control device 20 nor in control device 120. The identification device 250 may be connected to two predefined pin terminals, here pin terminals 240 and $24_1$, of the adapter module 220, via two electrical wires, for example.

Furthermore, the adapter module 220 includes at least one communication interface 260 which is used for communication with the bus system 280 and the device 270 connected thereto, which are configured for communication in accordance with the fourth communication protocol. Furthermore, preferably, at least one device 290 for level conversion according to the fourth communication protocol is provided, associated with communication interface 260.

Communication interface 260 comprises an electrical connector to which the device 270 is connectable via bus system 280. For example, communication interface 260 comprises two ports that are connected to predefined electrical pin terminals, in the present example to the electrical pin terminals 242 and 243 of connector 230, via electrical wires or conductor traces.

Furthermore, it should be noted that the microcontroller of identification device 250 may be configured for identifying whether the communication interface 260 has something connected thereto.

Now, assuming that the bus system 280 has been connected using the adapter module 220, to control device 20, for example.

A first step may comprise to transmit the identifier stored in storage device 251 to the control device 20, under control of the control and evaluation device 23 of control device 20, or under control of the microcontroller of adapter module 220. The control and evaluation device 23 is configured to determine, with the aid of identification device 250, i.e. on the basis of the received identifier, that the associated fourth communication protocol is not stored in control device 20 but in the adapter module 220. In response to the evaluated identifier, the control and evaluation device 23 is now able to execute the fourth communication protocol so as to enable communication between the at least one device 270 connected to the adapter module 220 and the control device 20 according to the fourth communication protocol. For this purpose, the control device 20 can access the fourth communication protocol stored in adapter module 220, or the adapter module 220 is configured to transfer the fourth communication protocol to the control device 20, for example via terminals 240 and $24_1$ of the connector 230. The fourth communication protocol may then be stored in the storage device 22 temporarily or may continue to be stored for a longer period. Longer period means that the fourth communication protocol will continue to be stored in the storage device 22 even when the adapter module 220 has been separated from the control device 20.

Control device 120 may be configured similarly to the control device 20 to enable communication with the device 270 connected to the bus system 280 using the fourth communication protocol stored in the adapter module 220 when the adapter module 220 is connected to the connector 124 of the control device.

According to an advantageous embodiment, the two control devices may each include an internal power supply source, such as a respective battery or rechargeable battery. It is also conceivable for the two control devices to each have a power supply port for connecting an external power supply source through which the rechargeable battery, if provided, can be recharged, for example. The adapter modules can be powered via the respective control devices. The adapter modules and the control devices may have appropriate interfaces for this purpose. It is also conceivable for the adapter modules to each have an internal power supply source such as a respective battery or rechargeable battery, for example. It is also conceivable for the adapter modules to each have a power supply port for connecting an external power supply source through which the rechargeable battery, if provided, can be recharged.

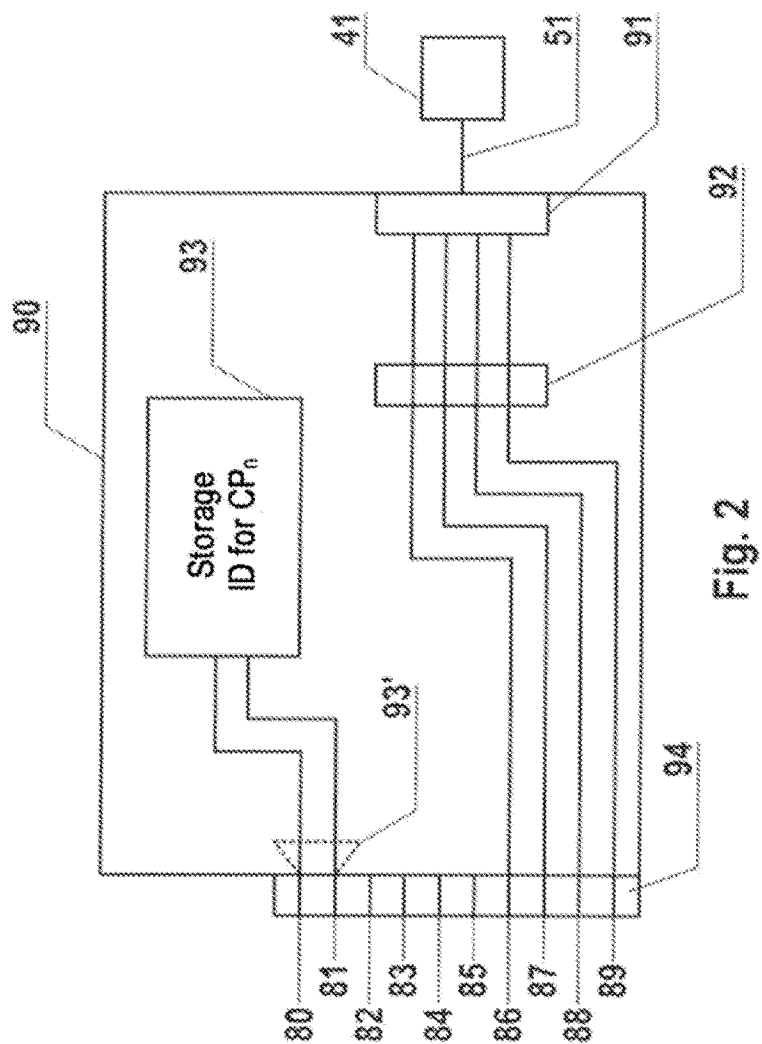

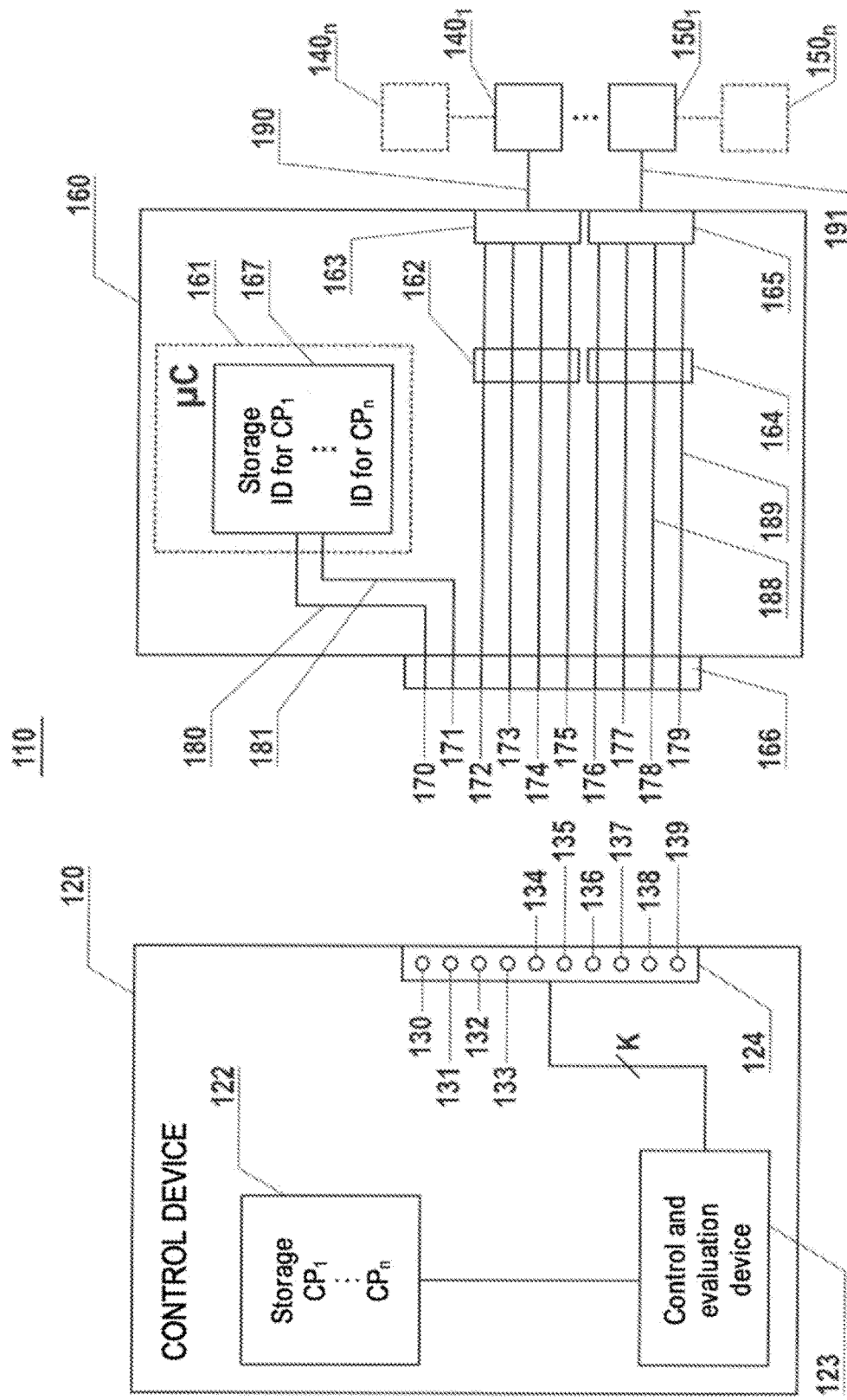

The invention claimed is:

1. A control and data transfer system for supporting different communication protocols, comprising:
a control device comprising:
a storage device which stores at least a first, a second and a third communication protocols, the first, the second and the third communication protocols being different;
a control and evaluation device configured for executing the first, the second and the third communication protocols stored in the storage device; and
at least one first connector having a plurality of selectable electrical terminals; and
a first adapter module connectable to the control device, wherein the first adapter module and the control device are implemented as separate components, the first adapter module comprising:
a second connector having a plurality of electrical terminals, which is configured for being electrically and mechanically mated with the at least one first connector;
an identification device enabling identification of the first and the second communication protocols, wherein the identification device comprises at least one electrical wire which short-circuits at least two predetermined electrical terminals;
a communication interface for connecting at least one first field bus device that is configured for communication according to the first communication protocol to the first adapter module via a first bus system; and
a further communication interface for connecting at least one second field bus device that is configured for communication according to the second communication protocol to the first adapter module via a second bus system;
wherein the control and evaluation device is adapted to use the identification device for identifying the first and second communication protocols to be used when the first adapter module is connected to the control device and based on the shorted circuits of the at least two predetermined electrical terminals, and to load and execute the identified first and second communication protocols from the storage device, so that communication is enabled according to the first communication protocol between the at least one first field bus device connected to the first adapter module and the control device and further that communication is enabled according to the second communication protocol between the at least one second field bus device connected to the first adapter module and the control device.

2. The control and data transfer system of claim 1, wherein the control and evaluation device is configured to be responsive to the identified first communication protocol by choosing a first set of electrical terminals from among the electrical terminals of the first connector and to be responsive to the identified second communication protocol by choosing a second set of electrical terminals from among the electrical terminals of the first connector, with the first and second sets containing respective different electrical terminals.

3. The control and data transfer system of claim 1, wherein: the identification device comprises a storage device which stores an identifier of the first communication protocol and an identifier of the second communication protocol; and the control and evaluation device is configured to read out the storage device when the first adapter module is connected to the control device.

4. The control and data transfer system of claim 1, wherein: the identification device comprises an electronic circuit comprising a microcontroller, Field programmable Gate Array (FPGA), or Application-Specific Integrated Circuit (ASIC), which stores an identifier of the first communication protocol and an identifier of the second communication protocol; and wherein: the control and evaluation device is configured to prompt the electronic circuit to transmit the identifier of the first communication protocol and the identifier of the second communication protocol to the control device when the first adapter module is connected to the control device; or
wherein: the electronic circuit is configured to initiate transmission of the identifier of the first communication protocol and of the identifier of the second communication protocol to the control device when the first adapter module is connected to the control device.

5. The control and data transfer system of claim 1, wherein:
the storage device stores a fourth communication protocol which differs from the first, the second and the third communication protocols;
a second adapter module is provided, which is connectable to the control device, the second adapter module and the control device are implemented as separate components, wherein the second adapter module comprises:
a third connector having a plurality of electrical terminals, which is configured for being electrically and mechanically mated with a further first connector of the control device;
an identification device enabling identification of the fourth communication protocol; and
a communication interface for connecting at least one third field bus device that is configured for communication according to the fourth communication protocol to the second adapter module via a third bus system; and
the control and evaluation device is configured to use the identification device of the second adapter module for identifying the fourth communication protocol to be used when the second adapter module is connected to the control device, and to load and execute the identified fourth communication protocol from the storage device, so that communication is enabled according to the fourth communication protocol between the at least one third field bus device connected to the second adapter module and the control device.

6. The control and data transfer system of claim 5, wherein the control and evaluation device is configured to be responsive to the identified fourth communication protocol by choosing the corresponding electrical terminals of the further first connector.

7. The control and data transfer system of claim 5, wherein: the identification device of the second adapter module comprises a storage device which stores an identifier of the fourth communication protocol; and the control and evaluation device is configured to read out the storage device of the identification device of the second adapter module when the second adapter module is connected to the control device.

8. The control and data transfer system of claim 5, wherein:

the identification device of the second adapter module comprises an electronic circuit which stores an identifier of the fourth communication protocol; wherein:
the control and evaluation device is configured to prompt the electronic circuit of the second adapter module to transmit the identifier of the fourth communication protocol to the control device when the second adapter module is connected to the control device; or
wherein: the electronic circuit of the second adapter module is configured to initiate transmission of the identifier of the fourth communication protocol to the control device when the second adapter module is connected to the control device.

9. The control and data transfer system of claim 5, wherein: the identification device of the second adapter module comprises at least one electrical wire which short-circuits at least two predetermined electrical terminals; and
the control and evaluation device is configured to detect the short-circuited electrical terminals and, based thereon, to identify the fourth communication protocol to be used.

10. The control and data transfer system of claim 1, wherein the first adapter module includes a device for signal level conversion in accordance with the second communication protocol.

11. The control and data transfer system of claim 1, wherein: the control and evaluation device is configured to identify whether a bus system using the third communication protocol is directly connected to the at least one first connector; and the control and evaluation device executes the third communication protocol when the bus system using the third communication protocol is connected to the at least one first connector.

12. The control and data transfer system of claim 1, wherein: the first adapter module comprises a device for signal level conversion in accordance with the first communication protocol.

13. The control and data transfer system of claim 5, further comprising:
a third adapter module connectable to the control device, comprising: a connector having a plurality of electrical terminals, which is configured for being electrically and mechanically mated with the at least one first connector;
an identification device enabling identification of a fifth communication protocol which is stored in the third adapter module; and
a communication interface for connecting at least one field bus device that is configured for communication according to the fifth communication protocol to the third adapter module via a fifth bus system;
wherein the control and evaluation device is configured to use the identification device for identifying the fifth communication protocol when the third adapter module is connected to the control device, and to execute the identified fifth communication protocol that is stored in the third adapter module, so that communication is enabled according to the fifth communication protocol between the at least one field bus device connected to the third adapter module and the control device.

14. The control and data transfer system of claim 5, wherein:
the second adapter module comprises a device for signal level conversion in accordance with the fourth communication protocol.

15. A control and data transfer system for supporting different communication protocols, comprising:
a control device comprising:
a storage device which stores at least a first, a second and a third communication protocol, the first, the second and the third communication protocols being different;
a control and evaluation device configured for executing the communication protocols stored in the storage device; and
at least one first connector having a plurality of selectable electrical terminals; and
a first adapter module connectable to the control device, comprising:
a second connector having a plurality of electrical terminals, which is configured for being electrically and mechanically mated with the at least one first connector;
a first identification device enabling identification of the first communication protocol, wherein the first identification device comprises at least one electrical wire which short-circuits at least two predetermined electrical terminals; and
a communication interface for connecting at least one first field bus device that is configured for communication according to the first communication protocol to the first adapter module via a first bus system;
a second adapter module connectable to the control device, wherein the first and second adapter modules and the control device are implemented as separate components, the second adapter module comprising:
a third connector having a plurality of electrical terminals, which is configured for being electrically and mechanically mated with a further first connector of the control device;
a second identification device enabling identification of the third communication protocol; and
a communication interface for connecting at least one second field bus device that is configured for communication according to the third communication protocol to the second adapter module via a second bus system;
wherein the control and evaluation device is adapted to use the first identification device for identifying the first communication protocol to be used when the first adapter module is connected to the control device and based on the shorted circuits of the at least two predetermined electrical terminals, and to load and execute the identified first communication protocol from the storage device, so that communication is enabled according to the first communication protocol between the at least one first field bus device connected to the first adapter module and the control device, and
wherein the control and evaluation device is configured to use the second identification device of the second adapter module for identifying the third communication protocol to be used when the second adapter module is connected to the control device, and to load and execute the identified third communication protocol from the storage device, so that communication is enabled according to the third communication protocol between the at least one second field bus device connected to the second adapter module and the control device.

16. The control and data transfer system of claim 15, wherein:

the first adapter module comprises a device for signal level conversion in accordance with the first communication protocol.

17. The control and data transfer system of claim 15, wherein:
the second adapter module comprises a device for signal level conversion in accordance with the third communication protocol.

\* \* \* \* \*

UNITED STATES PATENT AND TRADEMARK OFFICE
CERTIFICATE OF CORRECTION

PATENT NO. : 11,778,072 B2
APPLICATION NO. : 17/271559
DATED : October 3, 2023
INVENTOR(S) : Andreas Engel and Martin Marschner It is certified that error appears in the above-identified patent and that said Letters Patent is hereby corrected as shown below:

On the Title Page

Please replace the illustrative print figure, as shown in Fig. 1 on the attached drawing sheet.

In the Drawings

Please replace Figs. 1-5 with the drawings presented.

Signed and Sealed this
Thirteenth Day of February, 2024

Katherine Kelly Vidal
*Director of the United States Patent and Trademark Office*